United States Patent Office 3,021,302
Patented Feb. 13, 1962

3,021,302
POLYMERIC STANNONIC ACID STABILIZED POLYMERS CONTAINING VINYL CHLORIDE
Hans Helmut Frey, Frankfurt am Main, and Christoph Dörfelt, Altötting, Upper Bavaria, Germany, assignors to Farbwerke Hoechst Aktiengesellschaft vormals Meister Lucius & Brüning, Frankfurt am Main, Germany, a corporation of Germany
No Drawing. Filed Jan. 28, 1959, Ser. No. 789,496
Claims priority, application Germany Feb. 4, 1958
10 Claims. (Cl. 260—45.5)

The present invention relates to stabilized polymers containing vinyl chloride.

Excellent stabilizers for polymers containing vinyl chloride are organo-tin compounds since they enable the preparation of glass-clear shaped articles of polymers containing vinyl chloride.

The constantly increasing demands which are made, with respect to the output, on the machines for the manufacture of shaped articles from polymers containing vinyl chloride are associated with increasing demands on the stabilizers for this class of artificial materials. It is, therefore, desirable further to improve the known organo-tin stabilizers to enable them to meet modern requirements. Since the organo-tin stabilizers are rather expensive the concentration of the stabilizer in the polymers containing vinyl chloride is in general kept as low as possible. Consequently an increase of the concentration of the organo-tin stabilizer in a mixture containing vinyl chloride does not constitute a solution of the problem of improving the thermostability of such a mixture that could be made use of in the industry.

The present invention provides a process for stabilizing polymers containing vinyl chloride wherein polymeric alkyl stannonic acids, alkyl-thio-stannonic acids or the corresponding aryl compounds as well as co-condensation products thereof or mixtures of the aforesaid compounds are admixed with the polymers. Polymeric butyl-stannonic acids, polymeric butyl-thio-stannonic acids and the co-condensation products thereof are particularly suitable. The effects obtained are particularly good when co-condensation products of butyl-stannonic acid and butyl-thio-stannonic acid are used in a ratio within the range of about 1:10 to 10:1.

The stabilizers according to the invention have a completely unexpected, strong stabilizing effect in which they very much excel the known commercial organo-tin stabilizers. This excellent effect can be noticed especially when the stabilizer is incorporated in a low concentration with the polymer containing vinyl chloride. A concentration within the range of 0.05 to 0.5% ensures a stabilization that is sufficient for the working up of polymers containing vinyl chloride. In special cases the stabilizer may even be used in a concentration of up to 5%.

It is remarkable that these stabilizers do not only protect the vinyl-chloride-containing polymers against thermal decomposition, they also render them stable to the detrimental influence of sunlight.

By polymeric stannonic acids and thio-stannonic acids are understood the condensation products from stannonic acid and thio-stannonic acid respectively, the products having the respective degrees of condensation of $m$ and $n=2$ to about 1,000 and preferably 2 to 100. Polymeric alkyl-stannonic acids correspond approximately to Formula I given below and polymeric alkyl-thio-stannonic acids correspond approximately to Formula II given below. In the co-condensation products units of alkyl-stannonic acid alternate with units of alkyl-thio-stannonic acid according to general Formula III given below.

(Formula I)     $(RSnO_{1.5})_n$
(Formula II)    $(RSnS_{1.5})_n$
(Formula III)   $(RSnO_{1.5})_m(RSnS_{1.5})_n$ These three types of compound can be represented by the common formula (IV)            $(RSnX_{1.5})_n$ where X is oxygen, sulfur, and mixtures thereof containing these elements in a weight proportion ranging between 1:10 and 10:1.

The alkyl group (R) of the polymeric stannonic acids or thio-stannonic acids may contain 1 to 20 carbon atoms and preferably contains 4 carbon atoms. Polymeric aryl- and cycloalkyl-stannonic acids and aryl- and cycloalkyl-thio-stannonic acids are likewise effective but they do not show the extremely good effect of the alkyl compounds. The preparation of the aforesaid compounds is described in Belgian Patent No. 568,054, dated November 27, 1958.

The organo-tin stabilizers according to the present invention may be used alone or in admixture with known organo-tin or other stabilizers.

By polymers containing vinyl chloride are here to be understood homo- and copolymers of vinyl chloride and mixtures consisting principally of polymers containing vinyl chloride. As copolymers of vinyl chloride there may be mentioned those containing no more than 50% of vinylidene chloride, vinyl acetate, vinyl stearate, acrylic acid esters, maleic acid esters or mixtures of these monomers. As mixtures based on polymers containing vinyl chloride, i.e. mixtures containing at least 50% of polymers containing vinyl chloride, there may be mentioned mixtures containing at most 50% of synthetic rubber, for example copolymers of butadiene with acrylonitrile or butadiene with styrene, and mixtures containing at most 50% of chlorinated or sulfochlorinated polyolefins or mixtures thereof, for example those described in Belgian Patent No. 553,925. During the process of working up the polymers containing vinyl chloride known plasticizers, lubricants, filling materials, dyestuffs and pigments may be added.

The following examples serve to illustrate the invention but they are not intended to limit it thereto, the parts being by weight.

Example 1

70 parts of a polyvinyl chloride prepared by suspension polymerization and having a K value of 70 were mixed at 175° C. on a mixing roller with 30 parts of di-octyl phthalate while 0.2%—calculated on polyvinyl chloride—of the stabilizers indicated below and 1% of a commercial lubricant based on montan wax were added. The polyvinyl chloride mixture was rolled (rate of revolutions of the rollers: $n_{1,2}=11$) until it stuck to the rollers. In the following tables the time after which the material stuck to the apparatus is indicated in minutes and referred to as thermostability. Comparison tests were carried out with dibutyl-tin-bis-thioglycolic acid-(2-ethyl-hexyl)-ester, a commercial tin stabilizer which contains a sulfur bridge and which, owing to its good thermostabilizing effect is regarded as one of the best organo-tin stabilizers.

| Stabilizer | Thermostability in minutes |
|---|---|
| polymeric butyl stannonic acid | 27 |
| polymeric butyl thio-stannonic acid | 53 |
| co-condensation product from butyl-stannonic acid and butyl-thio-stannonic acid (1:2) | 84 |
| co-condensation product from butyl-stannonic acid and butyl-thio-stannonic acid (2:1) | 111 |
| commercial tin stabilizer containing a sulfur bridge | 8 |
| the aforesaid stabilizer to which 2% of a lubricant has been added | 31 |

Example 2

70 parts of polyvinyl chloride prepared by suspension polymerization and having a K value of 70 and 30 parts of dioctyl phthalate were mixed at 170° C. as described in Example 1 while 0.1%—calculated on the polyvinyl chloride—of one of the stabilizers indicated below and 2% of a lubricant based on montan wax or 1% of Ca-stearate were added. The polyvinyl chloride mixture was rolled until it stuck to the rollers. Comparison tests were carried out with the commercial tin stabilizer containing a sulfur bridge which has been mentioned in Example 1.

| Lubricant | Stabilizer | Thermo-stability in minutes |
|---|---|---|
| lubricant based on montan wax. | co-condensation product from butyl-stannonic acid and butyl-thio-stannonic acid (2:1). | 72. |
| Do | commercial tin stabilizer containing a sulfur bridge. | 28. |
| Ca-stearate | co-condensation product from butyl-stannonic acid and butyl-thio-stannonic acid (2:1). | (experiment stopped after 90 minutes.) |
| Do | commercial tin stabilizer containing a sulfur bridge. | 70. |

With regard to the thermostability obtained in the experiments in which Ca-stearate was used as a lubricant, the thermostabilizing effect of the stearate has to be taken into account. Under the conditions under which the experiments were carried out this effect was in the order of about 40 minutes so that the stability was increased by about 30 minutes by the thermostabilizing effect of the commercial tin stabilizer as can be gathered from the experiments carried out with the neutral commercial lubricant based on montan wax (cf. the first lines of the preceding table). The stabilizing effect of the Ca-stearate is of no consequence to the comparison of the stabilizers because this effect takes place in both experiments in the like manner.

Example 3

When a polyvinyl chloride prepared by suspension polymerization was rolled (rate of revolutions of the rollers $n_1=21$ and $n_2=15$) at 180° C. with the addition of 1% of a lubricant based on montan wax and 1% of stabilizer until the rolled sheet adhered or stuck to the rollers or turned black the following result was obtained:

| Stabilizer | Adhesion | Sticking | Blackening |
|---|---|---|---|
| co-condensation product from butyl-stannonic acid and butyl-thio-stannonic acid (1:2). | did not occur. | did not occur. | did not occur. |
| co-condensation product from butyl-stannonic acid and butyl-thio-stannonic acid (2:1). | ---do--- | ---do--- | Do. |
| commercial tin stabilizer containing a sulfur bridge. | occurred after 65 minutes. | ---do--- | occurred after 70 minutes. |

In this table "did not occur" means that the effect mentioned was not yet noticeable after 120 minutes.

Example 4

A copolymer of vinyl chloride and vinyl acetate (proportion by weight 87:13) prepared by suspension polymerization and having a K value of 50, was mixed by rolling (rate of revolutions of the rollers $n_{1,2}=11$) at 140° C. while 1% of a lubricant based on montan wax and 0.1% of stabilizer were added. The mixture was rolled until it stuck to the rollers or turned black. The following result was obtained:

| Stabilizer | Blackening |
|---|---|
| co-condensation product from butyl-stannonic acid and butyl-thio-stannonic acid. | had not yet occurred after 60 minutes. |
| polymeric butyl-stannonic acid | had not yet occurred after 55 minutes. |
| commercial tin stabilizer containing a sulfur bridge. | occurred after 35 minutes. |

Example 5

A polyvinyl chloride prepared by suspension polymerization was rolled at 180° C. while 1% of a lubricant based on montan wax and 1% of stabilizer were added. Rolling was continued until the rolled sheet turned dark. The following result was obtained:

| Stabilizer (1%) | Time after which the sheet turned dark, minutes |
|---|---|
| polymeric methyl-stannonic acid | 50 |
| polymeric methyl-thio-stannonic acid | 70 to 80 |
| co-condensation product from methyl-stannonic acid and methyl-thio-stannonic acid (1:7) | 100 |
| co-condensation product from methyl-thio-stannonic acid and butyl-thio-stannonic acid (1:1) | 60 |
| polymeric n-octyl-thio-stannonic acid | 80 to 90 |
| polymeric phenyl-stannonic acid | 10 |
| polymeric phenyl-thio-stannonic acid | 20 |

Example 6

The copolymers of vinyl chloride and the mixtures of polyvinyl chloride with other polymeric compounds, which are indicated in the following table, were rolled on a roller at 175° C. while 1% of a co-condensation product from butyl-thio-stannonic acid and butyl-thio-stannonic acid (2:1) and 1% of a lubricant based on montan wax were added. Rolling was continued until the material turned dark. The following result was obtained:

| Copolymer of vinyl chloride with— | Time after which the material turned dark, minutes |
|---|---|
| 25% of maleic acid dicetyl ester | 53 |
| 30% of acrylic acid butyl ester | 13 |

| Mixture of polyvinyl chloride with— | Time after which the material turned dark, minutes |
|---|---|
| 15% of a copolymer of butadiene with styrene (17%) and acrylonitrile (16%) | 100 |
| 20% of chlorinated low pressure polyolefin containing 40% of chlorine | 134 |

We claim:

1. A composition of matter comprising (1) a member of the group consisting of homopolymers and copolymers of vinyl chloride and (2) as a stabilizer 0.05 to 5 percent by weight, calculated on the composition, of a polymeric product of the general formula $$(RSnX_{1.5})_n$$

wherein R is a member selected from the group consisting of an alkyl radical having 1 to 20 carbon atoms, an aryl radical and a cyclo-alkyl radical, X is selected from the group consisting of oxygen, sulfur and a mixture of oxygen and sulfur containing these elements in a weight proportion ranging between 1:10 and 10:1; and $n$ is an integer between 2 and about 1000.

2. A composition of matter comprising (1) polyvinyl chloride and (2) as a stabilizer 0.05 to 5 percent by weight, calculated on the composition, of a polymeric product of the general formula $$(RSnX_{1.5})_n$$

wherein R is a member selected from the group consisting of an alkyl radical having 1 to 20 carbon atoms, an aryl radical and a cyclo-alkyl radical, X is selected from the group consisting of oxygen, sulfur and a mixture of oxygen and sulfur containing these elements in a weight proportion ranging between 1:10 and 10:1; and $n$ is an integer between 2 and about 1000.

3. A composition of matter comprising (1) a copolymer of at least 50% by weight vinyl chloride and at most 50% by weight of a monomer selected from the group consisting of vinyl acetate, vinyl stearate, vinylidene chloride, acrylic acid esters, maleic acid esters and mixtures thereof, and (2) as a stabilizer 0.05 to 5 percent by weight, calculated on the composition, of a polymeric product of the general formula $$(RSnX_{1.5})_n$$

wherein R is a member selected from the group consisting of an alkyl radical having 1 to 20 carbon atoms, an aryl radical and a cyclo-alkyl radical, X is selected from the group consisting of oxygen, sulfur and a mixture of oxygen and sulfur containing these elements in a by weight proportion ranging between 1:10 and 10:1; and $n$ is an integer between 2 and about 1000.

4. A composition of matter comprising (1) a mixture consisting mainly of polyvinyl chloride and containing in addition thereto a member selected from the group consisting of a copolymer of butadiene and acrylonitrile, a copolymer of butadiene and styrene, a chlorinated polyolefin, a sulfochlorinated polyolefin and mixtures thereof, and (2) as a stabilizer 0.05 to 5 percent by weight, calculated on the composition, of a polymeric product of the general formula $$(RSnX_{1.5})_n$$

wherein R is a member selected from the group consisting of an alkyl radical having 1 to 20 carbon atoms, an aryl radical and a cyclo-alkyl radical, X is selected from the group consisting of oxygen, sulfur and a mixture of oxygen and sulfur containing these elements in a by weight proportion ranging between 1:10 and 10:1; and $n$ is an integer between 2 and about 1000.

5. A composition of matter comprising (1) a mixture consisting mainly of a copolymer of at least 50% by weight vinyl chloride and at most 50% by weight of a monomer selected from the group consisting of vinyl acetate, vinyl stearate, vinylidene chloride, acrylic acid esters, maleic acid esters and mixtures thereof and containing in addition thereto a member selected from the group consisting of a copolymer of butadiene and acrylonitrile, a copolymer of butadiene and styrene, a chlorinated polyolefin, a sulfochlorinated polyolefin and mixtures thereof and (2) as a stabilizer 0.05 to 5 percent by weight, calculated on the composition, of a polymeric product of the general formula $$(RSnX_{1.5})_n$$

wherein R is a member selected from the group consisting of an alkyl radical having 1 to 20 carbon atoms, an aryl radical and a cyclo-alkyl radical, X is selected from the group consisting of oxygen, sulfur and a mixture of oxygen and sulfur containing these elements in a by weight proportion ranging between 1:10 and 10:1; and $n$ is an integer between 2 and about 1000.

6. The product of claim 1, wherein the stabilizer is butyl-stannonic acid.

7. The product of claim 1, wherein the stabilizer is butyl-thio-stannonic acid.

8. The product of claim 1, wherein the stabilizer is a product obtained by condensation of 1 to 10 parts by weight of butyl-stannonic acid and 10 to 1 parts by weight of butyl-thio-stannonic acid.

9. The product of claim 1, wherein the stabilizer is a condensation product from 1 part by weight butyl-stannonic acid and 2 parts by weight butyl-thio-stannonic acid.

10. The product of claim 1, wherein the stabilizer is a condensation product from 2 parts by weight of butyl-stannonic acid and 1 part by weight butyl-thio-stannonic acid.

References Cited in the file of this patent
UNITED STATES PATENTS 2,713,585   Best _____ July 19, 1955